United States Patent [19]

Sakamoto et al.

[11] Patent Number: 5,129,721
[45] Date of Patent: Jul. 14, 1992

[54] ADVANCED WAVEFORM OBSERVATION SYSTEM USING WAVEFORM SMOOTHING WITH RESTRICTED WAVEFORM LEVEL DIFFERENCE

[75] Inventors: Takashi Sakamoto; Satoshi Makita, both of Atsugi, Japan

[73] Assignee: Anritsu Corporation, Tokyo, Japan

[21] Appl. No.: 727,001

[22] Filed: Jul. 8, 1991

[30] Foreign Application Priority Data

Jul. 10, 1990 [JP] Japan .................. 2-181735

[51] Int. Cl.$^5$ .......................................... G01N 21/88
[52] U.S. Cl. .................................................. 356/73.1
[58] Field of Search ........................................ 356/73.1

[56] References Cited

FOREIGN PATENT DOCUMENTS 63-285669 11/1988 Japan .
2-227657 9/1990 Japan .

OTHER PUBLICATIONS

Applied Spectroscopy, vol. 38, No. 1, 1984, "Adaptive Smoothing of Spectroscopic Data by a Linear Mean-Square Estimation", pp. 49–58.

Primary Examiner—Vincent P. McGraw
Attorney, Agent, or Firm—Frishauf, Holtz, Goodman & Woodward

[57] ABSTRACT

According to this invention, a waveform data input section inputs sequential discrete waveform data to be observed. A level restricting section determines whether a level of the other data in a predetermined data period including a predetermined number of data continuous to one data of the discrete waveform input data is existed or not within a predeter mined restriction value using a level of the one data as reference level, directly outputs the data when the level of the data is existed within the predetermined restriction value, and restricts the level of the data within the predetermined restriction value to output the data when the level of the data is not existed within the predetermined restriction value. A averaging section averages the predetermined number of data output by the level restricting section. A control section sequentially shifts a sequence of the one data having the reference level in a determining operation of the level restricting section, thereby obtaining output data by smoothing the waveform data to be observed from an averaging section. A display section displays, under the control of the control section, the output data obtained by smoothing the waveform data and output from the averaging section.

12 Claims, 7 Drawing Sheets

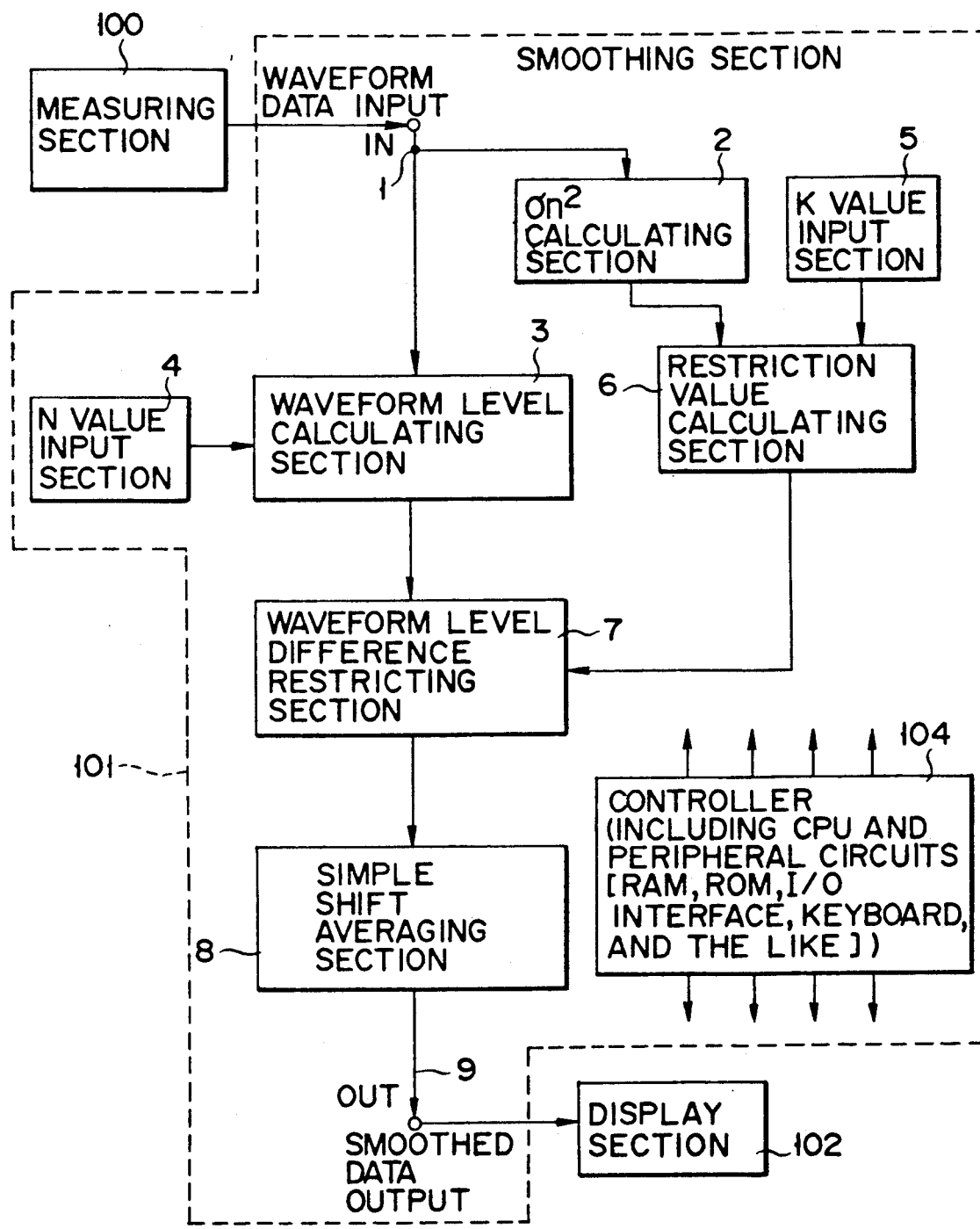
F I G. 1

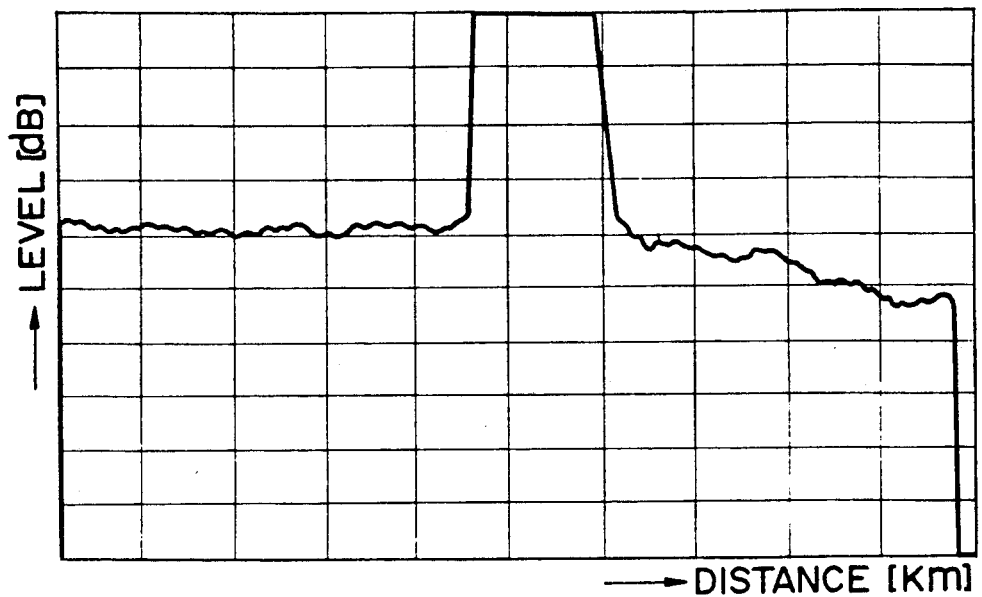
F I G. 6
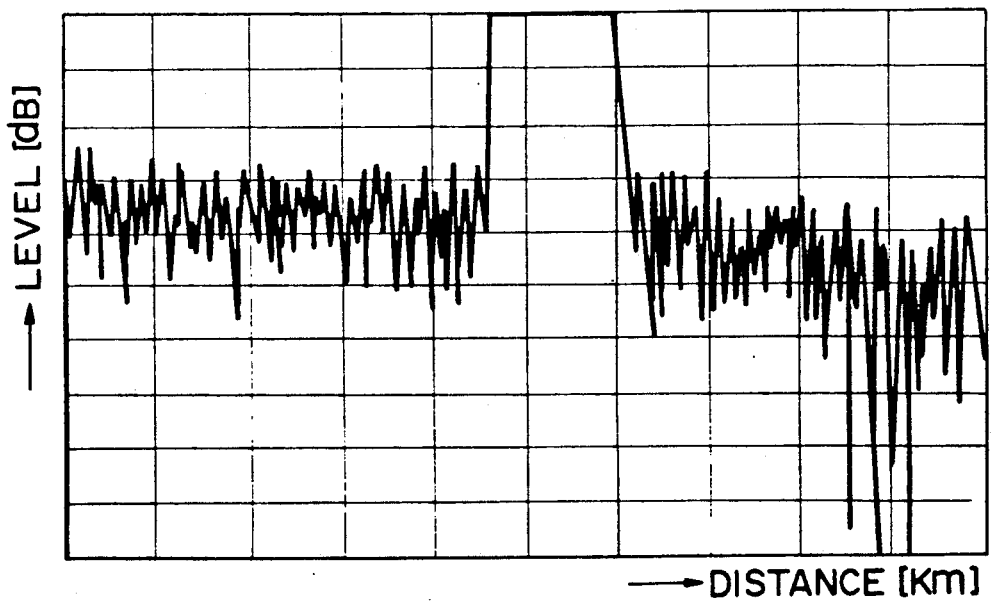
F I G. 7

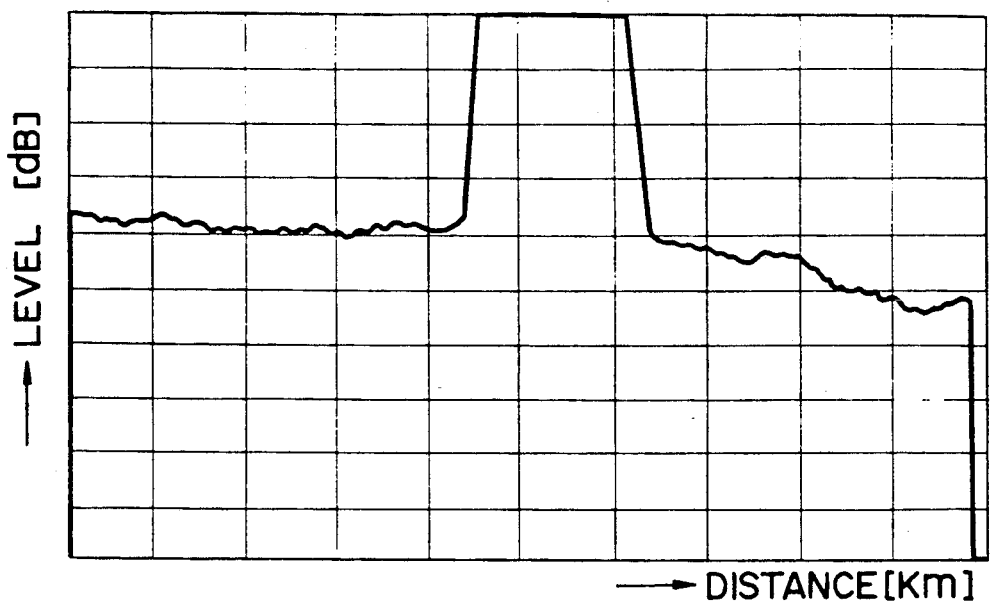
F I G. 8
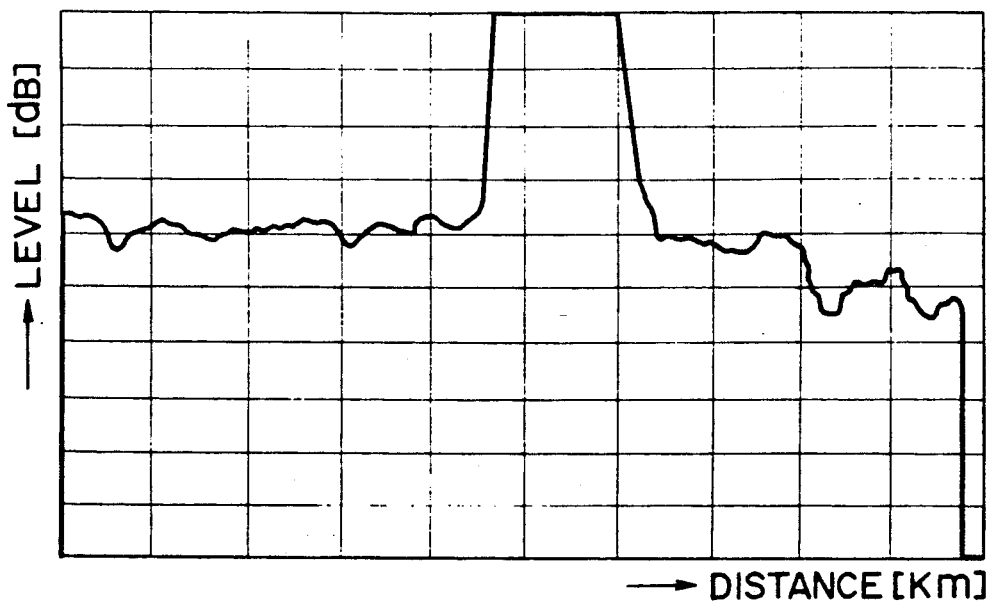
F I G. 9

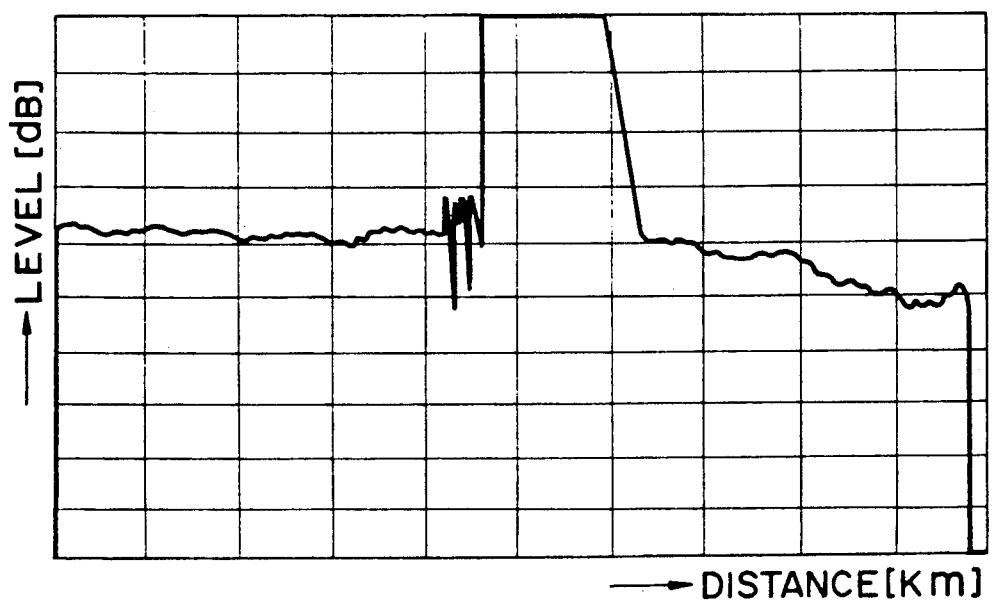
F I G. 10 ns to a wave-
ADVANCED WAVEFORM OBSERVATION SYSTEM USING WAVEFORM SMOOTHING WITH RESTRICTED WAVEFORM LEVEL DIFFERENCE

BACKGROUND OF THE INVENTION

1. Field of the Invention

The present invention generally relates to a waveform observation system and, more particularly, to a waveform observation system such as an optical time domain reflectometer (to be referred to as an OTDR hereinafter) used in a noise reduction device by a smoothing process.

2. Description of the Related Art

In recent years, in the field of measuring equipment, various waveform observation apparatuses have been realized. A high-precision waveform observation apparatus having accurate observation is strongly demanded.

The above-described OTDR is known as one of these waveform observation apparatuses.

The OTDR incidences an optical pulse into an optical fiber to be measured and converts a reflection optical pulse reflected from a fault point of the optical fiber and a backscattering light generated in the optical fiber into an electric signal at a light-receiving section so as to detect the electric signal. A predetermined operating process is executed to the detected signal to measure the optical loss or fault point of the optical fiber to be measured.

In an OTDR of this type, since the backscattering light is represented as a very smally detection signal, an S/N ratio of the detection signal must be increased by a digital averaging method using an A/D converter, and the signal buried in noise must be detected without waveform distortion.

Since an increase in S/N ratio by a noise reduction technique using a digital averaging process depends on the number of averaging processes and the number of bits of the A/D converter, a time for a measuring process is practically restricted, and an actual increase in S/N ratio is limited due to actual restriction of a measuring processing time and quantization noise. For this reason, in the OTDR using this technique, especially, it may be difficult to accurately measure a long-distance optical fiber.

Of operating techniques for reducing a noise component included in a waveform to be measured without influence of restriction of a measuring time by a smoothing process to extract a target signal component, a technique called a shift averaging method is known.

This shift averaging method performs the following processes to digital waveform data to reduce noise.

When the waveform data has n discrete values $x(i)$ ($i=1, 2, 3, \ldots, n$), a resultant value of $x(i)$, i.e., an average value $y(i)$ is calculated using a "weighting function" $w(j)$ ($j=-m, \ldots, -1, 0, 1, \ldots, m$) constituted by $N$ ($=2m+1$) discrete points as follows:

$$y(i) = \frac{1}{W} \sum_{j=-m}^{m} w(j) \cdot x(i+j) \qquad \text{\textcircled{1}}$$
$$W = \sum_{j=-m}^{m} w(j)$$

When the weighting function $w(j)$ to be used has a rectangular shape shown in FIG. 2A, a method using this weight function is called a simple shift averaging method. When the weighting function $w(j)$ to be used is a function shown in FIG. 2B, a method using this function is called a polynomial adaptation method.

As is apparent from equation ①, in the shift averaging method, a weighted averaging process is performed to the N data having the value $x(i)$ as a center by the function $w(j)$, thereby calculating the averaged value $y(i)$.

In the shift averaging method for performing the above process, when a waveform level is rapidly changed in a smoothing period N having data $x(i)$ at a middle portion thereof obtained by the width of the weighting function, the change disadvantageously becomes moderate at the positive or negative edge of the rectangular pulse waveform, i.e., the waveform becomes rounded.

In order to solve the above drawback of the shift averaging method, an adaptive smoothing method is used.

That is, in the adaptative smoothing method, a variance $\sigma_n^2(i)$ of noise of waveform data and a variance $\sigma_x^2(i)$ of waveform data in a smoothing period N are calculated, thereby calculating a smoothing value $y(i)$ as follows:

$$y(i) = \frac{\sigma_x^2(i) - \sigma_n^2}{\sigma_x^2(i)} \{x(i) - \bar{x}(i)\} + \bar{x}(i) \qquad \text{\textcircled{2}}$$

where $\bar{x}(i)$ is an average value obtained by performing the simple shift averaging method to the N waveform data.

The above adaptative smoothing method has characteristics as follows. If $\sigma_x^2(i) \approx \sigma_n^2$, then $y(i) \approx \bar{x}(i)$, and if $\sigma_x^2(i) >> \sigma_n^2$, then $y(i) \approx x(i)$.

That is, according to the adaptative smoothing method, due to the above characteristics, when a waveform level is rapidly changed in the smoothing period N (i.e., $\sigma_x^2(i) >> \sigma_n^2$), $y(i) = x(i)$ is obtained. An original waveform is directly used as a smoothing value, and the waveform is not rounded.

In this case, however, a noise component is directly output as the smoothing value, noise is not advantageously reduced.

When a waveform is rounded or noise is not effectively reduced in an OTDR, a marker cannot be desirably adjusted to a predetermined waveform point not to accurately detect a fault point of an optical fiber.

As described above, in the noise reduction technique by a smoothing process free from an influence of restriction of measuring time, although a simple shift averaging method and a polynomial application method included in a shift averaging method is effective to noise reduction, a signal waveform is rounded. In addition, in the adaptative smoothing method, although the signal waveform is not rounded, when the level of the waveform is rapidly changed, noise is not reduced at the rapidly changed portion of the waveform.

Therefore, the noise reduction technique by a smoothing process cannot be directly applied to an OTDR.

SUMMARY OF THE INVENTION

It is, therefore, an object of the present invention to provide a new and improved waveform observation system which can perform accurate measurement for a short measuring time using a noise reduction device by a smoothing process capable of suppressing roundness of a waveform and effectively reducing noise.

According to one aspect of the present invention, there is provided a waveform observation apparatus comprising:

waveform data input means for inputting sequential discrete waveform data to be observed;

level restricting means for determining whether a level of another data in a predetermined data period including a predetermined number of data continuous to one data of the discrete waveform input data input by the waveform data input means is existed or not within a predetermined restriction value using a level of the one data as a reference level, for directly outputting the data when the level of the other data is existed within the predetermined restriction value, and for restricting the level of the data within the predetermined restriction value to output the data when the level of the other data is not existed within the predetermined restriction value;

averaging means for averaging the predetermined number of data output by the level restricting means;

control means for sequentially shifting a sequence of the one data having the reference level in a determining operation of the level restricting means, thereby causing to output smoothed data for the waveform data to be observed from an averaging means; and display means for displaying, under the control of the control means, the smoothed data output from the averaging means.

According to another aspect of the present invention, there is provided a method for observing a waveform, the method comprising the steps of:

inputting a waveform data to be observed, the waveform data including a predetermined number of sequential discrete waveform input data;

determining whether level of another data in a predetermined data period including a predetermined number of data continuous to one data of the discrete waveform input data is existed or not within a predetermined restriction value using a level of the one data as a reference level, directly outputting the data to output the data when the level of the data is existed within the predetermined restriction value, and restricting the level of the data within the predetermined restriction value when the level of the data is not existed within the predetermined restriction value;

averaging the predetermined number of data which has a restricted level and is output;

sequentially shifting a sequence of the one data having a reference level in a determining operation of level restriction, thereby causing to output smoothed data for the waveform data to be observed through an averaging process; and displaying the smoothed data output through the averaging process.

According to still another aspect of the present invention, there is provided an optical time domain reflectometer comprising:

optical pulse incident means for causing an optical pulse to be incident on an optical fiber to be measured;

light-receiving means for receiving a beam reflected by the optical fiber to be measured;

signal converting means for converting a signal output from the light receiving means into sequential discrete waveform data;

level restricting means for determining whether a level of the other data in a predetermined data period including a predetermined number of data continuous to one data of the discrete waveform input data input by the signal converting means is existed or not within a predetermined restriction value using a level of the one data as a reference level, for directly outputting the data when the level of the data is existed within the predetermined restriction value, and for restricting the level of the data within the predetermined restriction value to output the data when the level of the data is not existed within the predetermined restriction value;

averaging means for averaging the predetermined number of data output by the level restricting means;

control means for sequentially shifting a sequence of the one data having the reference level in a determining operation of the level restricting means, thereby causing to output smoothed data for the waveform data to be observed from an averaging means; and display means for displaying, under the control of the control means, the smoothed data output from the averaging means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and detailed description of the preferred embodiments given below, serve to explain the principles of the invention, in which:

FIG. 1 is a block diagram showing an arrangement of a main part of the first embodiment of the present invention;

FIGS. 6 to 10 are views in which the waveform displayed according to the second embodiment is compared with an original waveform and waveforms displayed by smoothing the original waveform using various smoothing processes.

DETAILED DESCRIPTION OF THE PREFERRED EMBODIMENTS

Figure 2A:
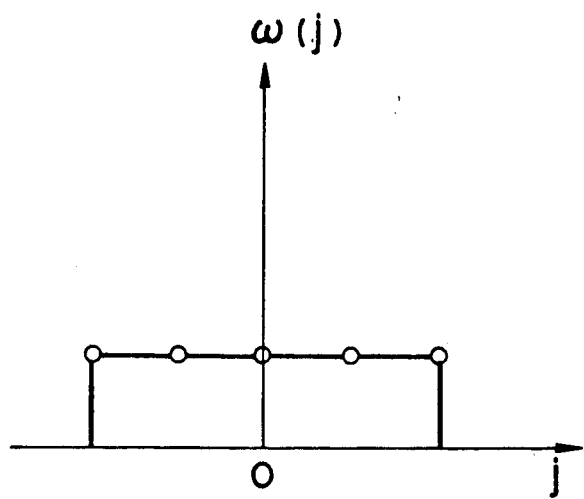
FIG. 2A is a graph illustrating a weighting function used in a smoothing process using a simple shift averaging method.
Figure 2B:
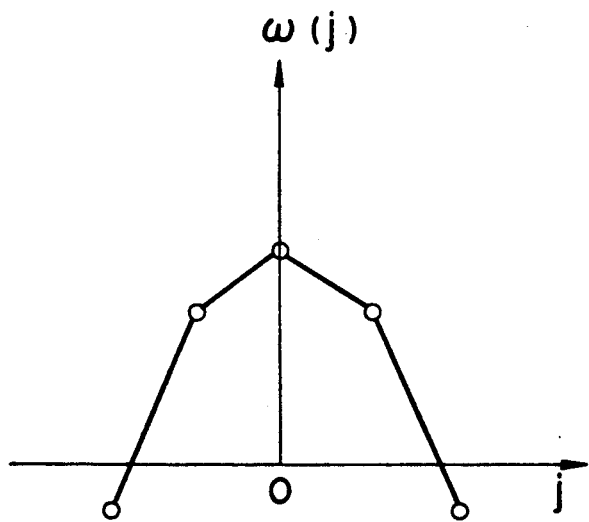
FIG. 2B is a graph illustrating a weighting function used in a smoothing process using a polynomial adaptation method.

Reference will now be made in detail to the presently preferred embodiments of the invention as illustrated in the accompanying drawings, in which like reference characters designate like or corresponding parts throughout the several drawings.

First, a smoothing method and a principle of a noise reduction device based on the smoothing method used in the present invention will be described below. In a noise reduction technique based on the smoothing process used in the present invention, the following process is executed to waveform data.

In order to give a predetermined restriction value to a predetermined number of sequential discrete waveform input data, i.e., waveform data in smoothing period, a noise variance $\sigma_n^2$ of e.g., the waveform data is calculated. Absolute values $|x(i)-x(j)|$ of differences between waveform data x(i) to be smoothed at a specified point and (N−1) waveform data x(j) except for the data x(i) in a smoothing period N are calculated.

The value $|x(i)-x(j)|$ is compared with a value $K\sqrt{\sigma_n^2}$ (K is a constant) given as a predetermined restriction value. In this case, if the comparison value is give by:

$$|x(i)-x(j)| \geq K\sqrt{\sigma_n^2} \qquad (3)$$

the x(j) is set to be, e.g., $$x(j) = x(i) \qquad (4)$$

If the value is given by:

$$|x(i)-x(j)| < K\sqrt{\sigma_n^2} \qquad (5)$$

the waveform data x(j) is set to be $$x(j) = x(j) \qquad (6)$$

The weighted averaging process used in the above-described known simple shift averaging method (or a polynomial adaptation method) is performed to the N waveform data and the resultant data is given as a smoothed value of the data x(i).

The feature of the noise reduction technique using the smoothing method of the present invention is described as follows. A variation in waveform data in the smoothing period N is restricted to, e.g., the value $K\sqrt{\sigma_n^2}$, and the shift averaging process is performed to the waveform data.

The symbol K represents a constant for determining a degree of noise reduction and is set to be a desired value, from 4 to 7.

Figure 3A:
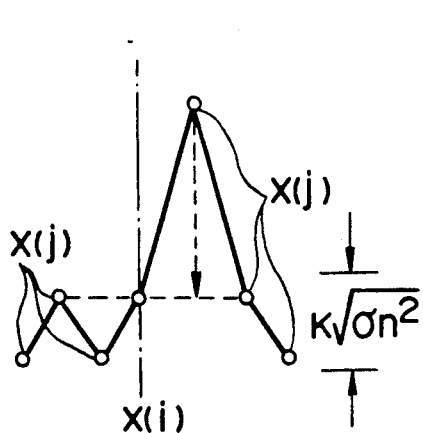
FIGS. 3A and 3B are views for explaining a principle of a noise reduction technique using a smoothing process of the present invention.

FIG. 3A is a view for explaining the above equations. When an absolute value of a level difference between the waveform data x(i) to be smoothed and waveform data x(j) does not exceed the restriction value $K\sqrt{\sigma_n^2}$, the waveform data x(j) is used as the waveform data x(j). When the absolute value exceeds the restriction value, the level of the waveform data x(j) is decreased to that of the data x(i). Thus, the weighted averaging process used in the simple shift averaging method is performed to the waveform data x(i).

Figure 3B:
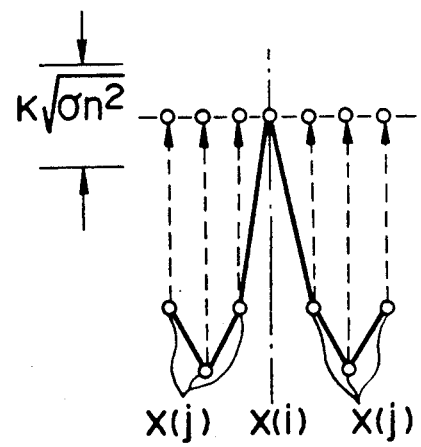

FIG. 3B is a view for also explaining the above equations. When absolute values of the level differences between the waveform data x(i) to be smoothed and N−1 (in this case, 6) waveform data x(j) exceed the restriction value $K\sqrt{\sigma_n^2}$, all the levels of, waveform data x(j) are increased to the levels of the waveform data x(i), and the weighted averaging process used in the simple shift averaging method is performed to the data x(i). Note that, in these cases, the data x(j) need not be set to be the data x(i), but may be set to be arbitrary data smaller than in the restriction value $K\sqrt{\sigma_n^2}$.

The first embodiment of the present invention will be described below on the basis of the above principle.

FIG. 1 is a view schematically showing an arrangement of a waveform observation apparatus according to the first embodiment of the present invention, and is a block diagram of a main part functionally showing the arrangement of a smoothing process section (a noise reduction device) 101. The waveform observation apparatus is mainly constituted by a measuring section 100, a smoothing section 101, and a display section 102. As the measuring section 100, for example, an OTDR or the like is used. The measuring section 100 outputs digital waveform data of a predetermined number of bits for each measuring point.

A variance $\sigma_n^2$ of noise included in waveform data 1 of a predetermined number of bits applied from the measuring section 100 to an input terminal IN of the smoothing section 101 and subjected to smoothing is calculated by a $\sigma_n^2$ calculating section 2. In a predetermined averaging period N, an absolute value $|x(i)-x(j)|$ of level differences between ith waveform data x(i) to be smoothed and (N−1) (=2m) waveform data x(j) from j=i−m to j=i+m having the data x(i) as a center, are calculated in a waveform level difference calculating section 3. Note that the smoothing period N is input from an N value input section 4.

By using a constant K for determining a degree of noise reduction input from a K value input section 5 and the variance $\sigma_n^2$ obtained from the $\sigma_n^2$ calculating section 2, a restriction value $K\sqrt{\sigma_n^2}$ is calculated by a restriction value calculating section 6.

The restriction value $K\sqrt{\sigma_n^2}$ is compared with the absolute values $|x(i)-x(j)|$ of the level difference between the data x(j) and x(i) at a waveform level difference restriction section 7.

During this comparison, the waveform level difference restriction section 7 outputs the data x(j) when the absolute value $|x(i)-x(j)|$ does not exceed the restriction value $K\sqrt{\sigma_n^2}$. When the absolute value $|X(i)-x(j)|$ exceeds the restriction value $K\sqrt{\sigma_n^2}$, the difference restriction section 7 replaces the level of the data x(j) with the level of the data x(i) and outputs it.

A simple shift average of the data x(i) and the (N−1) data x(j) including the replaced data x(j), i.e., the N waveform data are calculated by a simple shift averaging section 8. The resultant value is output from an output terminal OUT to a display section 102 as a smoothed data 9.

The above sequential processes are controlled by a controller 104 including a CPU and peripheral circuits (a ROM, a RAM, an I/O interface, and, a keyboard), so as to obtain the smoothed value for all of the waveform data.

Figure 4:
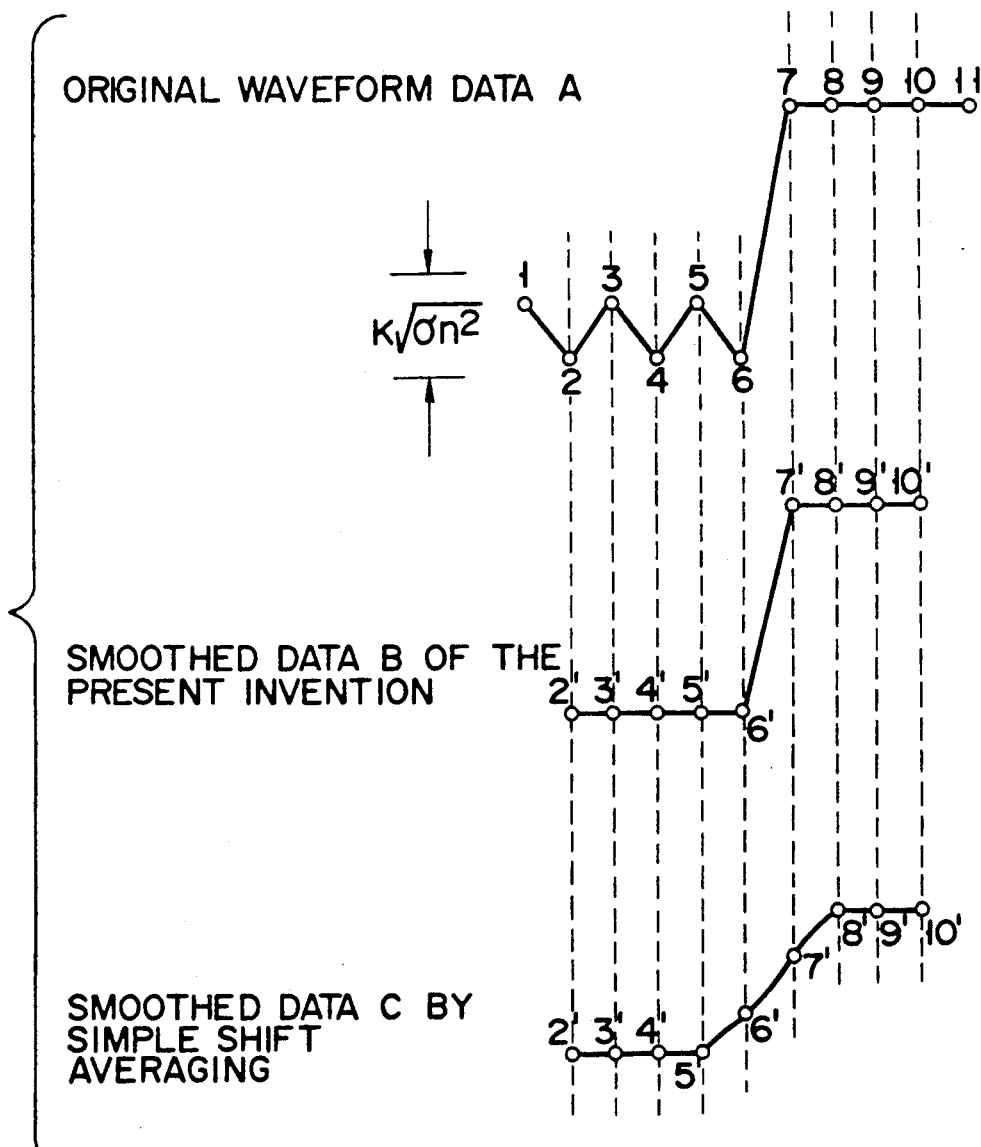
FIG. 4 is a view in which smoothed data obtained by smoothing an original waveform using the smoothing process of the present invention is compared with smoothed data obtained by smoothing the original waveform using only a conventional simple shift averaging method.

As shown in the display section 102, smoothed data B obtained when the smoothing period N=3 is applied to original data A according to the present invention does not include waveform roundness (represented by reference numerals 5' to 8' in FIG. 4) which occurs in smoothed data C obtained by a smoothing process using a simple shift averaging method, thereby effectively increasing an S/N ratio.

Figure 5:
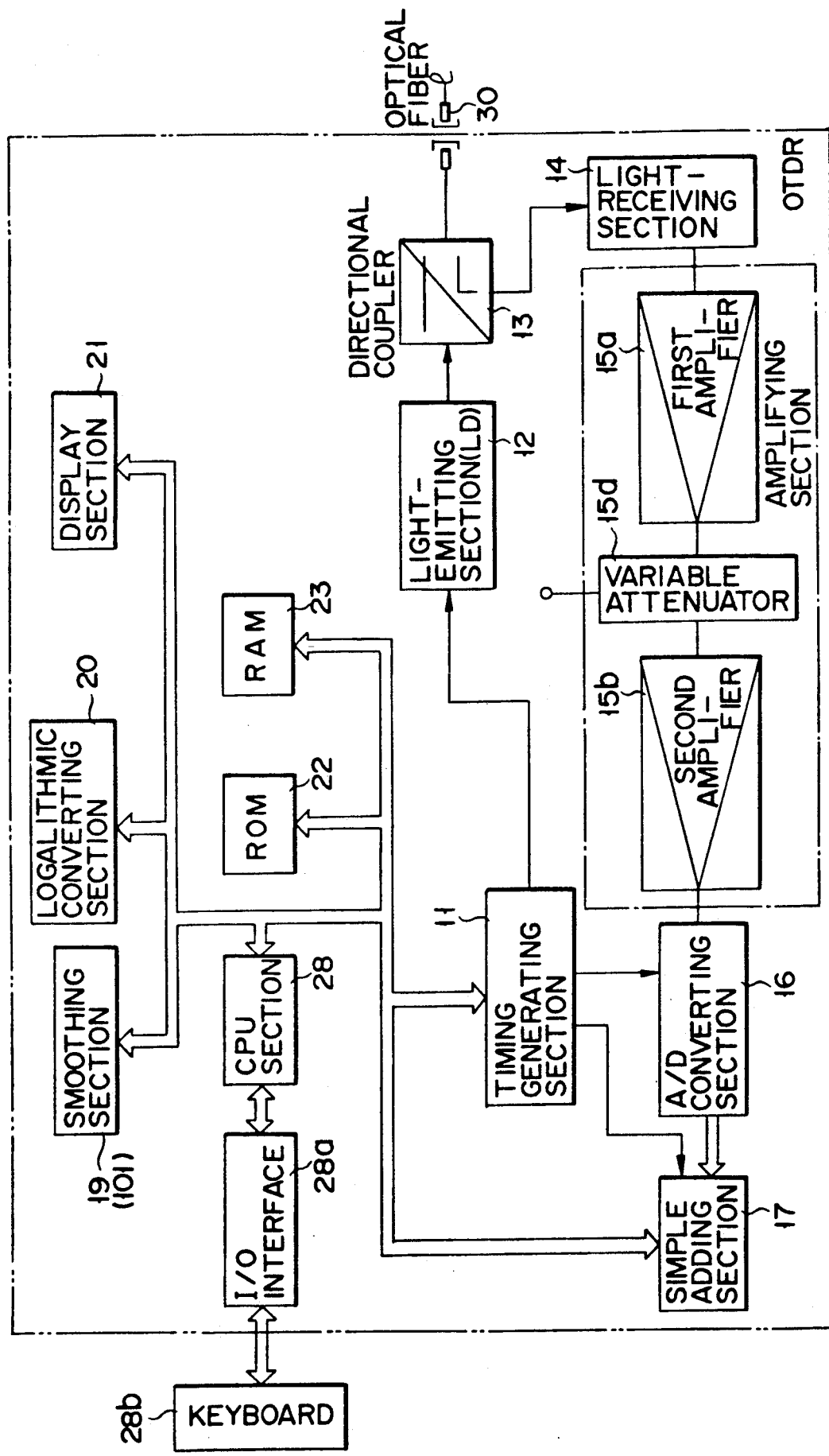
FIG. 5 is a block diagram showing an arrangement of a main part of the second embodiment of the present invention.

FIG. 5 shows the second embodiment of the present invention which is applied to an OTDR.

The OTDR of this embodiment substantially comprises a timing generating section 11, a light-emitting section 12, a directional coupler 13, a light-receiving section 14, an amplifying section 15 including first and second amplifiers 15a and 15b and a variable attenuator 15d, a simple adding section (digital averaging section) 17, a smoothing section 19, a logarithmic converting section 20, a display section 21, a ROM 22, a RAM 23, and a CPU section 28. This OTDR receives and detects a backscattering beam and a Fresnel beam reflected by an optical fiber 30 to be measured by supplying an optical pulse to the optical fiber 30 to be measured, and the received signals are amplified by the amplifying section 15 and then A/D-converted by the A/D converting section 16, thereby obtaining digital waveform data. A simple adding process (a digital averaging process) and a smoothing process are performed to the digital waveform data of each measuring point (e.g., each of 250 to 5,000 points), and the resultant waveform is displayed on the display section 21. An amount of attenuation of the variable attenuator 15d of the amplifying section 15 is manually or automatically controlled to have an optimal value such that saturation does not occur in the displayed waveform.

The CPU section 28 receives a command from the keyboard 28b through the I/O interface 28a and controls the timing generating section 11, the display section 21, the simple adding section 17, the RAM 23, the smoothing section 19, the logarithmic converting section 20, and the ROM 20.

The timing generating section 11 generates and outputs a trigger signal for causing a light-emitting element (e.g., a laser diode; LD) of the light-emitting section 12 to oscillate and a sampling pulse for driving the A/D converting section 16 and the simple adding section 17.

The light-emitting section 12 outputs an optical pulse on the basis of the trigger signal supplied from the timing generator 11, and the optical pulse is emitted to the optical fiber 30 to be measured through the directional coupler 13.

The directional coupler 13 splits the backscattering beam and the Fresnel reflection beam on the light-receiving section 14 side. These beams are reflected from the optical fiber 30 by supplying the optical pulse from the light-emitting section 12.

The light-receiving section 14 is constituted by, e.g., an avalanche photodiode (APD) and receives and detects the backscattering beam and the Fresnel reflection beam split by the directional coupler 13 and generated from the optical fiber 30 to be measured. The amplifying section 15 is constituted by including the first amplifier 15a, the variable attenuator 15d, and the second amplifier 15b. The first amplifier 15a provided in the previous stage amplifies the detection signal from the light-receiving section 14 with a predetermined degree of amplification. The variable attenuator 15d attenuates the signal amplified by the first amplifier 15a, and the signal is amplified by the second amplifier 15b of the sequential stage with a predetermined degree of amplification again. The amplified signal is output to the A/D converting section 16.

The A/D converting section 16 A/D-converts a signal output from the second amplifying section 15b on the basis of a sampling pulse supplied from the timing generating section 11 and outputs it to the simple adding section 17 as, e.g., digital data having 6 bits.

A signal is A/D-converted on the basis of the sampling pulse supplied from the timing generating section 11 as in the A/D converting section 16. The simple adding section 17 causes a digital averaging process to be sequentially applied to the converted signal $2^{10}$ to $2^{26}$ times at every measuring point of the optical fiber 30 to be measured and outputs it to the smoothing section 19 as data of 32 bits per point.

The smoothing section 19 serves as the noise reduction device of the smoothing section 101 in the first embodiment. The smoothing section 19 further reduces noise by a smoothing process so that the unsatisfactory noise reduction performed by the digital averaging process of the simple adding section 17 is compensated, thereby supplying output data of the smoothing section 19 to the logarithmic converting section 20.

The logarithmic converting section 20 sequentially converts the output data from the smoothing section 19 into logarithmic data, and the data is supplied to the display section 21 to be displayed.

FIG. 6 is a graph showing waveform data obtained when the original waveform (a number of measured points is 500) shown in FIG. 7 to which a smoothing process is applied and measured by the OTDR according to the second embodiment. FIG. 6 shows waveform data measured (a number of measured points is 500) when a smoothing period N=21 and a constant for determining a degree of noise reduction K=4. As is apparent from FIG. 6, no roundness of the waveform occurs at the positive and negative edges of the pulse waveform, and noise is effectively reduced.

In the noise reduction technique using the smoothing process of the present invention, when a signal level is lower than a noise level, the signal waveform is distorted. When the noise level is lower than the desired signal level by averaging using a simple adding process, smoothing according to the noise reduction technique by the smoothing process of the present invention is performed. At this time, the noise can be effectively reduced without rounding the signal waveform.

FIG. 8 shows a display waveform obtained when a original waveform is smoothed by a conventional simple shift averaging method. In FIG. 8, although noise is satisfactorily reduced, the positive and negative edges of the pulse waveform are rounded, and the pulse width of the waveform is larger than that of the original waveform (FIG. 6).

FIG. 9 shows a display waveform obtained when the original waveform is smoothed by a conventional polynomial adaptation method. In FIG. 9, although the width of the pulse waveform is smaller than that of the pulse waveform in FIG. 8, a degree of noise reduction is degraded.

FIG. 10 shows a display waveform obtained when the original waveform is smoothed by a conventional adaptative smoothing method. In FIG. 10, although the width of the waveform is equal to that of the original waveform, noise remains in the positive edge of the pulse waveform.

Note that, in any cases in FIGS. 8 to 10, a number of measured points is 500, and a smoothing period N is given by N=21.

As is apparent from the above result, the noise reduction technique by the smoothing process of the present invention is effective much more than a noise reduction technique by other smoothing processes.

As described above, in the noise reduction technique using the smoothing process of the present invention, a variance value $\sigma_n^2$ of noise included in a waveform is calculated by a smoothing section in advance, and a variation in waveform data in a smoothing period N is restricted by a predetermined value $K\sqrt{\sigma_n^2}$ (K is a constant), thereby performing a smoothing process using a shift averaging method. Therefore, according to the present invention, the following drawbacks can be solved. That is, roundness of a signal waveform is included in a noise reduction apparatus using a smoothing process by a conventional simple shift averaging method, and a degree of noise reduction is degraded at a portion wherein a level of the waveform is rapidly changed.

In an OTDR to which the above smoothing technique is applied, the following advantages can be obtained.

(1) Since a display waveform having a higher S/N ratio can be obtained without rounding the positive edge of a Fresnel reflection beam emitted from a fault point or the like for a measuring time shorter than the measuring time for obtaining the same effect as described above by only simple adding process, a marker is rightly adjusted to a desired waveform point, and the fault point can be accurately measured.

(2) Since the negative edge of the Fresnel reflection beam and the negative edge of a step waveform of a backscattering beam at a fiber connection point are not rounded, a resolution between two points can be improved.

The present invention is not limited to the above embodiments shown in the accompanying drawings, and various changes and modifications may be effected without departing from the spirit and scope of the invention.

As described above, according to the present invention, there is provided a waveform observation apparatus such as an OTDR capable of accurately measuring a waveform for a short measuring time by a noise reduction device using a smoothing process capable of suppressing roundness of the signal waveform and effectively reducing noise.

Additional embodiment of the present invention will be apparent to those skilled in the art from consideration of the specification and practice of the present invention disclosed herein. It is intended that the specification and examples be considered as exemplary only, with the true scope of the present invention being indicated by the following claims.

What is claimed is:

1. A waveform observation apparatus comprising:
   waveform data input means for inputting sequential discrete waveform data to be observed;
   level restricting means for determining whether a level of another data in a predetermined data period including a predetermined number of data continuous to one data of said discrete waveform input data input by said waveform data input means is existed or not within a predetermined restriction value using a level of said one data as a reference level, for directly outputting the data when the level of said other data is existed within the predetermined restriction value, and for restricting the level of the data within the predetermined restriction value to output the data when the level of said other data is not existed within the predetermined restriction value;
   averaging means for averaging said predetermined number of data output by said level restricting means;
   control means for sequentially shifting a sequence of the one data having the reference level in a determining operation of said level restricting means, thereby causing to output smoothed data for said waveform data to be observed from said averaging means; and
   display means for displaying, under the control of said control means, said smoothed data output from said averaging means.

2. An apparatus according to claim 1, wherein said level restricting means includes means for calculating said predetermined restriction value in relation to a variance value of noise of said discrete waveform input data.

3. An apparatus according to claim 2, wherein said calculating means comprises:
   noise variance value calculating means for calculating a variance value ($\sigma_n^2$) of noise in relation to said discrete waveform input data input by said waveform data input means;
   reduction degree constant input means for inputting a constant (K) for determining a degree of noise reduction of said discrete waveform input data; and
   restriction value calculating means for calculating a restriction value ($K\sqrt{\sigma_n^2}$) of a variation in said discrete waveform input data on the basis of said variance value ($\sigma_n^2$) of noise calculated by said noise variance value calculating means and said constant (K) for determining a degree of noise reduction input by said reduction degree constant input means.

4. An apparatus according to claim 3, wherein said level restricting means further comprises:
   smoothing period value input means for inputting a smoothing period value (N) in relation to said discrete waveform input data input by said waveform data input means,
   level difference calculating means for calculating an absolute value $|x(i)-x(j)|$ of a waveform level difference between waveform data x(i) of a specific point to be smoothed in accordance with said smoothing period (N) value input by said smoothing period value input means and each of (N−1) waveform data x(j) included in said smoothing period (N) except for said waveform data of the specific point, and
   waveform level difference restricting means for comparing said absolute value $|x(i)-x(j)|$ of the waveform level difference calculated by said waveform level difference calculating means with the restriction value ($K\sqrt{\sigma_n^2}$) calculated by said restriction value calculating means to output waveform data as follows:

if $|x(i)-x(j)| \geq K\sqrt{\sigma_n^2}$ then x(j)=x(i); and if $|x(i)-x(j)| < K\sqrt{\sigma_n^2}$ then $x(j)=x(j)$.

5. An apparatus according to claim 4, wherein said averaging means includes shift averaging means for performing a smoothing process by a shift averaging method to waveform data output from said waveform level difference restricting means.

6. A method for observing a waveform, said method comprising the steps of:

inputting sequential discrete waveform data to be observed;

determining whether level of the other data in a predetermined data period including a predetermined number of data continuous to one data of said discrete waveform input data is existed or not within a predetermined restriction value using a level of said one data as a reference level, directly outputting said data when the level of said data is existed within said predetermined restriction value, and restricting the level of said data within said predetermined restriction value to output said data when the level of said data is not existed within said predetermined restriction value;

averaging said predetermined number of data which has a restricted level and is output;

sequentially shifting a sequence of said one data having a reference level in a determining operation of level restriction, thereby causing to output smoothed data for said waveform data to be observed through an averaging process; and displaying said smoothed data output through said averaging process.

7. An optical time domain reflectometer comprising:

optical pulse incident means for causing an optical pulse to be incident on an optical fiber to be measured;

light-receiving means for receiving a beam reflected by said optical fiber to be measured;

signal converting means for converting a signal output from said light receiving means into a predetermined number of sequential discrete waveform data;

level restricting means for determining whether a level of the other data in a predetermined data period including a predetermined number of data continuous to one data of said discrete waveform input data input by said signal converting means is existed or not within a predetermined restriction value using a level of said one data as a reference level, for directly outputting said data when the level of said data is existed within said predetermined restriction value, and for restricting the level of said data within said predetermined restriction value to output said data when the level of said data is not existed within said predetermined restriction value;

averaging means for averaging said predetermined number of data output by said level restricting means;

control means for sequentially shifting a sequence of said one data having the reference level in a determining operation of said level restricting means, thereby causing to output smoothed data for said waveform data to be observed from an averaging means; and display means for displaying, under the control of said control means, said smoothed data output from said averaging means.

8. A reflectometer according to claim 7, further comprising simple adding means, arranged between said signal converting means and said level restricting means, for executing averaging by a digital averaging process to each of said discrete waveform data output from said signal converting means a predetermined number of times so as to supply said data to said level restricting means.

9. A reflectometer according to claim 7, wherein said level restricting means includes means for calculating said predetermined restriction value in relation to a variance value of noise of said discrete waveform input data.

10. A reflectometer according to claim 9, wherein said calculating means comprises:

noise variance value calculating means for calculating a variance value ($\sigma_n^2$) of noise of the discrete waveform input data converted by said signal converting means;

reduction degree constant input means for inputting a constant (K) for determining a degree of noise reduction of said discrete waveform input data; and restriction value calculating means for calculating a restriction value ($K\sqrt{\sigma_n^2}$) of a variation of said discrete waveform input data on the basis of said variance value ($\sigma_n^2$) of noise calculated by said noise dispersion value calculating means and said constant (K) for determining a degree of noise reduction input by said reduction degree constant input means.

11. A reflectometer according to claim 10, wherein said level restricting means further comprises:

smoothing period value input means for inputting a smoothing period (N) value in relation to the discrete waveform input data converted by said signal converting means, waveform level difference calculating means for calculating absolute value $|x(i)-x(j)|$ of a waveform level difference between waveform data x(i) of a specific point to be smoothed in accordance with said smoothing period (N) value input by said smoothing period value input means and each of (N−1) waveform data x(j) included in said smoothing period (N) except for said waveform data of the specific point, and waveform level difference restricting means for comparing said absolute value $|x(i)-x(j)|$ of the waveform level difference calculated by said waveform level difference calculating means with the restriction value ($K\sqrt{\sigma_n^2}$) calculated by said restriction value calculating means to output waveform data as follows:

if $|x(i)-x(j)| \geq K\sqrt{\sigma_n^2}$ then $x(j)=x(i)$; and if $|x(i)-x(j)| < K\sqrt{\sigma_n^2}$ then $x(j)=x(j)$.

12. An apparatus according to claim 11, wherein said averaging means includes shift averaging means for performing a smoothing process by a shift averaging method to waveform data output from said waveform level difference restricting means.

* * * * *